United States Patent [19]
Ellis

[11] 3,974,565
[45] Aug. 17, 1976

[54] ADJUSTABLE CUTTING MACHINE
[75] Inventor: Emily W. Ellis, New York, N.Y.
[73] Assignee: Simplex Cutting Machine Company, Inc., New York, N.Y.
[22] Filed: Feb. 7, 1975
[21] Appl. No.: 548,004

[52] U.S. Cl. .............................. 30/376; 30/123.3; 83/471.3; 83/473; 83/477.1; 30/115
[51] Int. Cl.² .................................... B23D 45/16
[58] Field of Search ................ 83/471.2, 471.3, 473, 83/477.1, 486.1; 30/375, 376, 123.3

[56] References Cited
UNITED STATES PATENTS

| 2,294,497 | 9/1942 | Zawistowski | 30/123.3 |
| 2,913,025 | 11/1959 | Richards | 83/477.1 |
| 3,078,885 | 2/1963 | Burch | 30/376 |

Primary Examiner—Willie G. Abercrombie
Attorney, Agent, or Firm—Lackenbach, Lilling & Siegel

[57] ABSTRACT

An adjustable cutting machine having a pivoted frame and means for adjusting and locking the angular position of the frame for cutting sheet material at a desired angle.

14 Claims, 10 Drawing Figures

ADJUSTABLE CUTTING MACHINE

BACKGROUND AND SUMMARY OF THE INVENTION

The invention relates to a portable cutting machine, and more particularly to a machine which is adjustable for cutting sheet material, such as rubber, on an angle or along a vertical edge so as to cut strips of a desired width or thickness.

A prior art machine, disclosed in U.S. Pat. No. 2,294,497, is restricted to cutting only along a vertical line and, consequently, the machine is limited in its utility and applications because of such disadvantage. The present invention, on the other hand, cuts not only on a vertical line, but also at predetermined desired angles or bevels.

It is, therefore, a principal object of the present invention to provide a novel cutting machine having the adjustment capability enabling cuts in material to be made at right angles and also at acute and obtuse angles.

It is another object of the present invention to provide a cutting machine with a pivotable main plate or frame supporting the cutting blade adjustable by means of a pivotable arm connected to the main plate or frame and pivotable about the same axis.

It is yet another object of the present invention to provide for the incremental angular adjustment of the cutting blade by means of a locking mechanism which aligns the pivotable arm in the predetermined angular position for cutting a desired angle or bevel edge on the sheet material.

It is a further object of the present invention to provide an adjustable cutting machine which is extremely simple so as to be capable of economic manufacture and one which is durable and composed of relatively few components.

Other objects and advantages of the invention will become apparent upon reading the following specification and referring to the accompanying drawings, which form a material part of this disclosure.

The invention, accordingly, consists in the features of construction, combination of elements, and arrangement of parts which will be exemplified in the construction hereinafter described and of which the scope will be indicated by the appended claims.

DESCRIPTION OF THE PREFERRED EMBODIMENT

Figure 1:
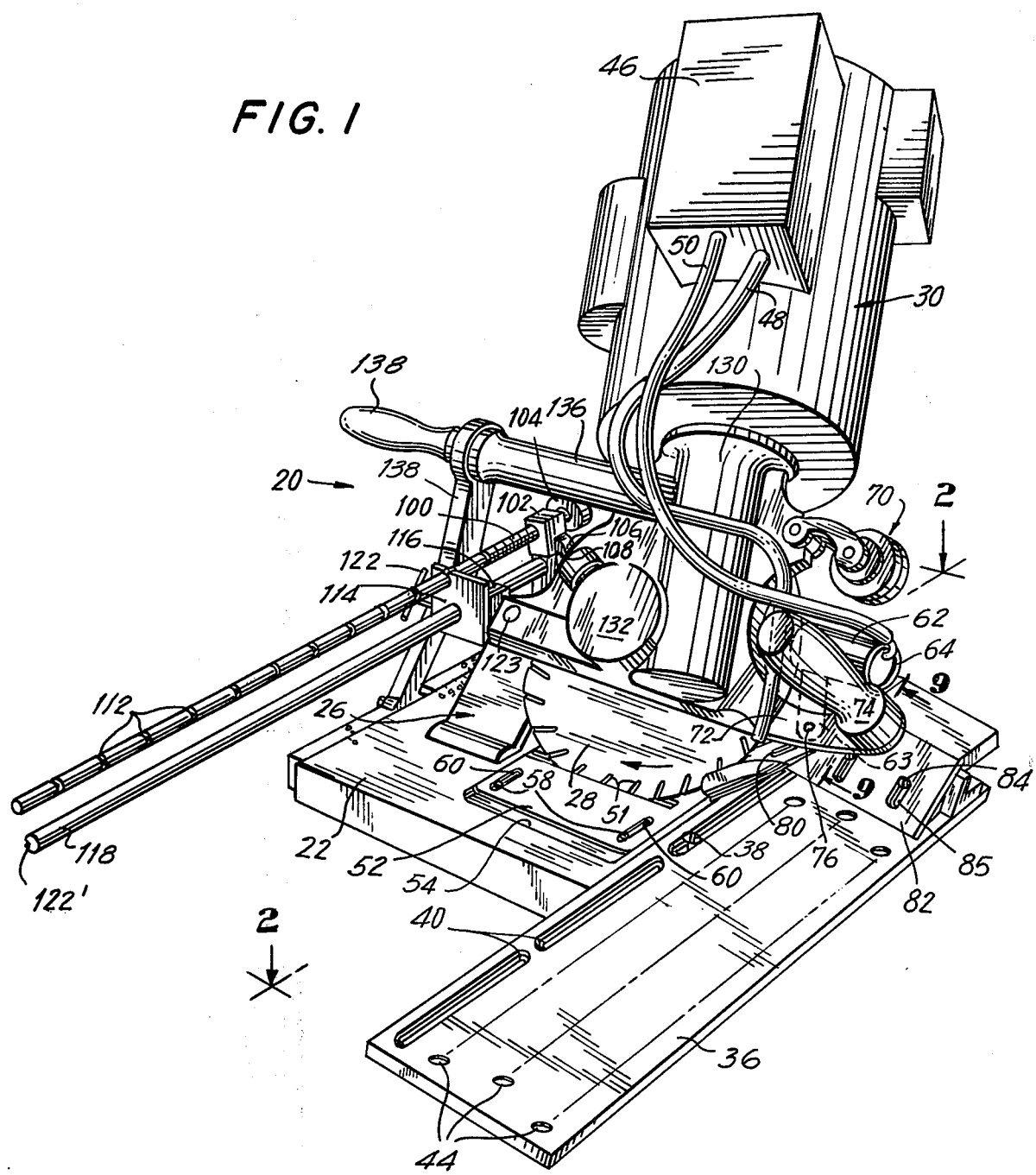
FIG. 1 is a perspective view showing an improved cutting machine of the present invention, wherein the cutting blade is disposed angularly with the base.
Figure 2:
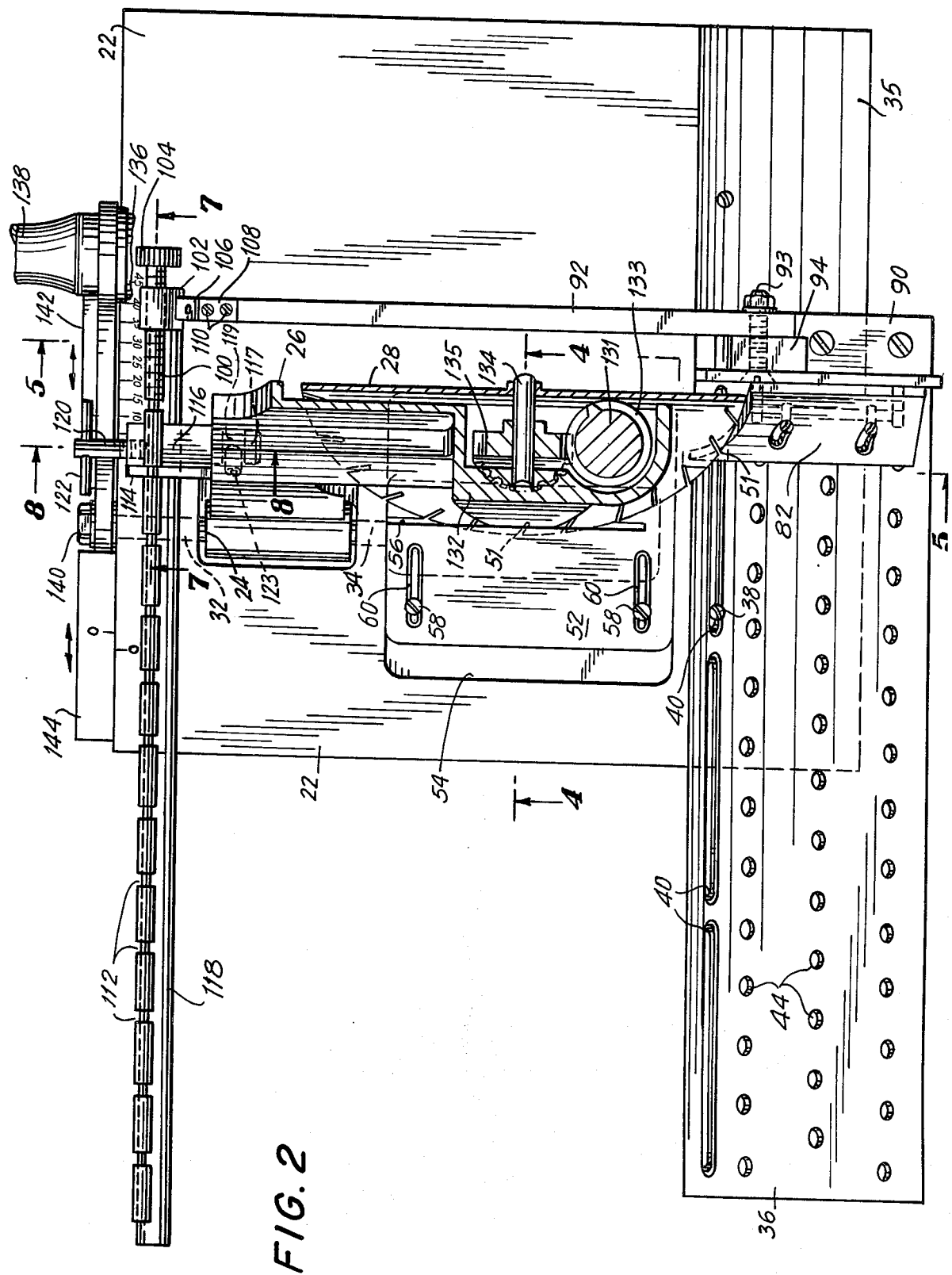
FIG. 2 is a cross-sectional view taken generally along the line 2—2 of FIG. 1.
Figure 3:
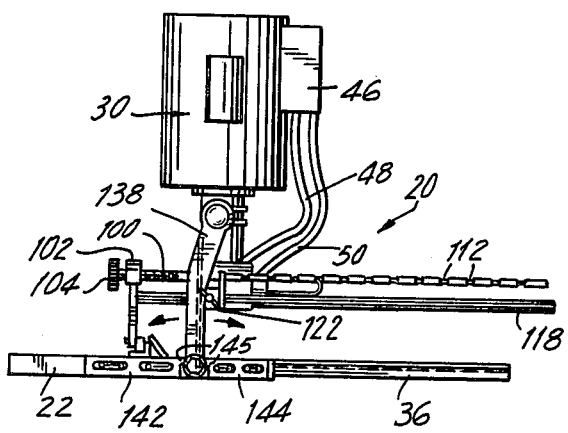
FIG. 3 is a rear elevational view of the cutting machine on a substantially reduced scale.

Referring now more particularly to the drawings, and specifically to FIGS. 1 and 2 thereof, an improved portable cutting machine of the present invention for cutting rubber or other like elastic materials is there generally designated 20. Although not shown, the base of the cutting machine may be suitably equipped on the underside thereof with a plurality of rollers so as to enable the machine to be readily moved about a supporting surface upon which the machine is placed. Such rollers or roller base may simply be of the type disclosed in the aforementioned U.S. Pat. No. 2,294,497.

Pivotably mounted to the supporting base or mounting plate 22 about a pin-like axis or shaft 24 is a main plate 26 which supports the cutting blade 28 and motor assembly 30. The shaft 24 is suitably in the form of a threaded bolt-like fastener and extends first through a suitable aperture 32 and is secondly suitably secured to a threaded hole, provided in the mounting plate 22 at 34.

Figure 4:
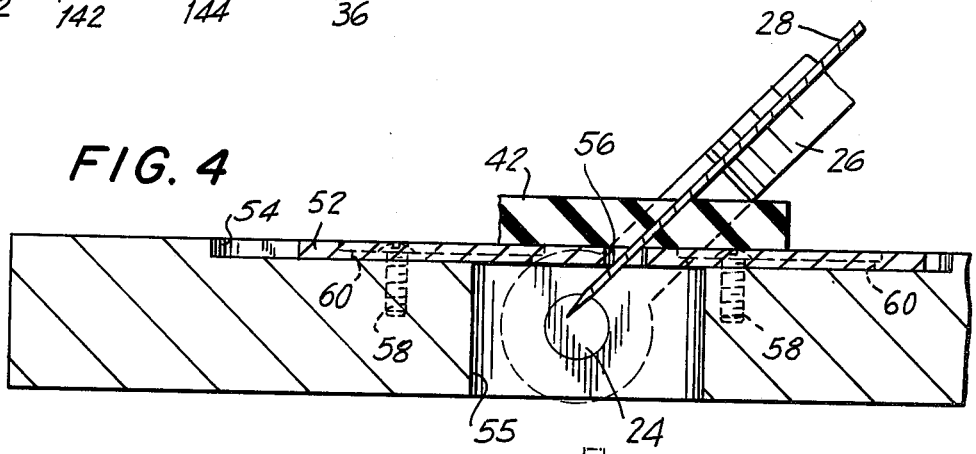
FIG. 4 is a partial sectional elevational view taken generally along the line 4—4 of FIG. 2.
Figure 6:
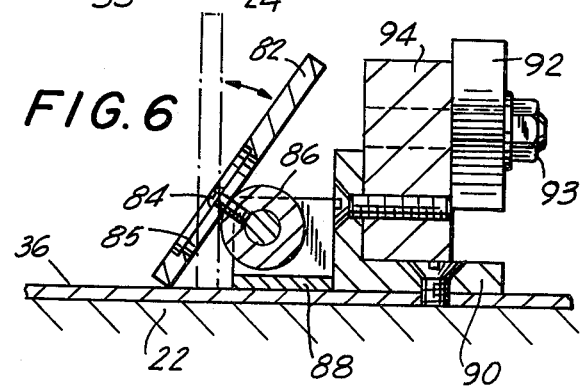
FIG. 6 is a partial sectional view taken generally along the line 6—6 of FIG. 5.
Figure 5:
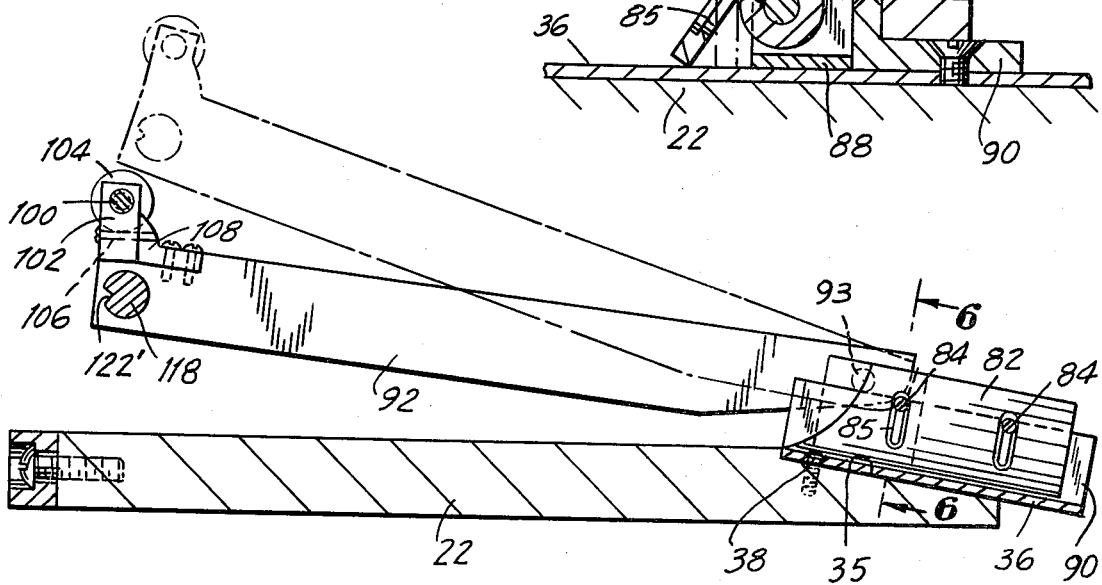
FIG. 5 is a sectional elevational view taken generally along the line 5—5 of FIG. 2.

Secured to an inclined front surface 35 of the mounting plate 22 is an inclined plate or ramp element 36, by means of fasteners 38 extending through elongated recessed slots 40 provided at the upper end of the ramp element 36. As best shown in FIGS. 4 and 5, the ramp element 36 serves to facilitate entrance of the material 42 to be cut during the movement of the machine along the work surface or table supporting the apparatus during use in cutting bevels or angles in materials, such as synthetic or natural rubber or other elastic-like materials. A plurality of openings 44 are provided in the ramp element 36, so as to provide exit passageways for the lubricating and/or cooling liquid (hereinafter described) dispensed on the cutting blade 28, which liquid insures smoother cutting operations, and minimizes or reduces the frictional resistance between the ramp element 36 and the material 42 to be cut.

The said liquid, which may suitably be ordinary tap water, is stored by means of an elevated reservoir, such as the container 46, suitably removably fastened by conventional hanging means to the motor assembly 30 by means well-known in the art. A pair of flexible hoses 48 and 50 are also removably attached to the bottom of the container 46 so that the container can be removed, if desired, so as to be conveniently refilled periodically. The container 46 has a suitable refill opening (not shown) at the top thereof and conventional valved outlets, such as shown in U.S. Pat. No. 2,294,497, may be provided at the bottom of the container 46 for connection to the hoses 48 and 50, thereby eliminating the manual need to preclude the bottom outlet pipe extensions from leaking if the container 46 is filled by removing it from the motor assembly 30. Hose 48 terminates in a suitable nozzle (not shown) and dispenses the lubricating and cooling liquid directly against the edge of the cutting blade 28 adjacent the cutting area or zone as best shown in FIG. 1, and hose 50 dispenses the liquid into a container or cup 62 suitably supported by pivotable arm means 63 on the main plate 26. This cup 62 contains a replaceable sponge-like material 64 and when the cup is angularly adjusted embraces the sides and edge of the cutting knife or blade 28, thus aiding in providing effective lubrication thereof.

The blade or knife is generally made of molybdenum-tungsten high speed steel alloy, and such alloy blades or knives can readily cut, for example, rubber of about 5 to about 10 durometer harder than tungsten steel knives. They will even cut wire up to about 0.015 inch diameter imbedded in the rubber. Such alloy blades perform efficiently inasmuch as they utilize the abrasion resistance that results from higher carbon and vanadium contents in the molybdenum-tungsten family of higher speed steels. The blades of knives are also provided with, as shown in the drawings, a plurality of slots 51 extending inwardly from the cutting edge so as to assist in the cooling of the blade or knife through action of the cooling liquid applied to the blade 28 and to insure uniformly smooth cut edges. The slots coincide with imaginary chord lines and are generally inclined in the direction of rotation of the blade.

A slidable knife guard plate 52 is disposed in a recessed portion 54 (the dash or phantom lines 55 being a cut-out section) provided in the mounting plate 22 and the guard plate 52 has an elongated slot 56 for clearing the circular knife or blade 28 as it passes below the work surface or top surface of plate 22. This guard plate 52 is moved and slides in the recessed cut-out portion 54, as is required as the angle of the blade 28 is adjusted from the vertical, as will be explained in greater detail hereinafter. Suitable screws 58 extending through elongated slots 60 enable adjustment of the guard plate 52 and also enable it to be fixedly screwed to the mounting plate 22.

A conventional pivoted pair of sharpening stones form an assembly at 70 and it is also suitably secured to the main plate 26 for automatically maintaining a fine sharp edge to the blade as it rotates during cutting operations.

An extension 72 from the main plate 26, supports a front handle 74 suitably secured thereto at substantially a right angle therewith, and extending pivotably therefrom at 76 by pin or fastener means is a front cage or safety guard cover 78 having a lower U-shaped portion for the edge of the blade 28 immediately in front of the blade. A suitable slot 80 enables the guard cover 78 to be positioned as desired about the blade's front edge. The fastener or pivot means 76 may also be used to suitably secure the container or cup 62 in a pivotable manner on the arm means 63.

The present apparatus also includes a linear adjustment feature similar to the one shown in said U.S. Pat. No. 2,294,497, but somewhat modified to be a more useful gauge having versatility and applicability to both a vertical edge side surface and a beveled or angled side surface of a cut sheet material. In lieu of just a fixed vertical gauge surface, an adjustable (see phantom lines and reference arrows) angle plate element 82 is connected by means of suitable screws 84 extending through elongated slots 85 in the plate element 82 to rotatable means 86, preferably in the form of a shaft or pin. The rotatable means 86 or shaft is supported by suitable bracket means 88 which means 88 in turn is suitably secured to or made part of an integral with the L-shaped bracket 90 which supports arm 92. The arm 92 is pivotably mounted about a fastener 93 via spacer means 94 to the L-shaped bracket 90. The gauge surface thus engages and sides along in juxtaposition to the edge of the sheet material to be cut as the cutting machine is moved along said material, thus cutting a predetermined set width or thickness of a strip or sheet of material, whether the material is cut on a vertical edge or angled or beveled edge. Thus, the ramp plate element 36 is moved transversely of the cutting plane of the blade or knife 28 to permit adjustments in the position of the gauge surface. The elongated recessed slots 40 permit such adjustments and guide the ramp element 36 upon loosening of the fasteners 38, so that a predetermined size strip of material may be cut as will be explained below.

Suitably, bevels ranging from about 20° to about 90° in 5° increments are provided with the present apparatus. Bevels or angles greater than 90° can also be simply achieved by reversing the material and thus providing for angles anywhere from 90° to about 160°.

Figure 7:
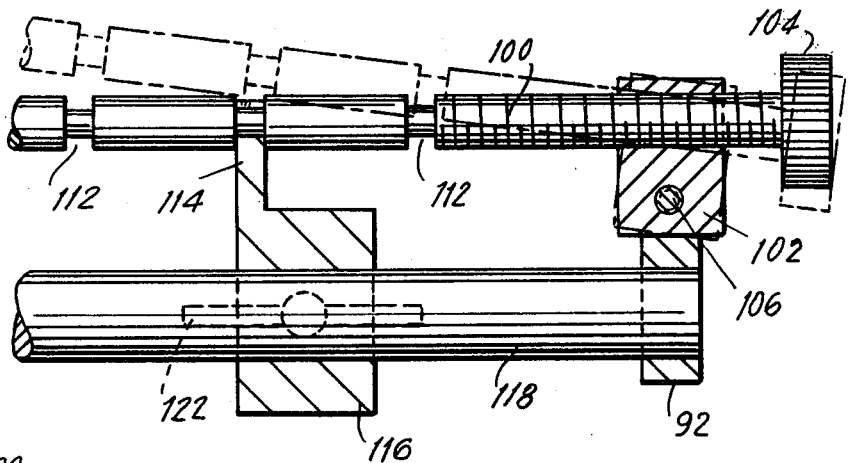
FIG. 7 is a partial sectional elevational view taken generally along the line 7—7 of FIG. 2.
Figure 8:
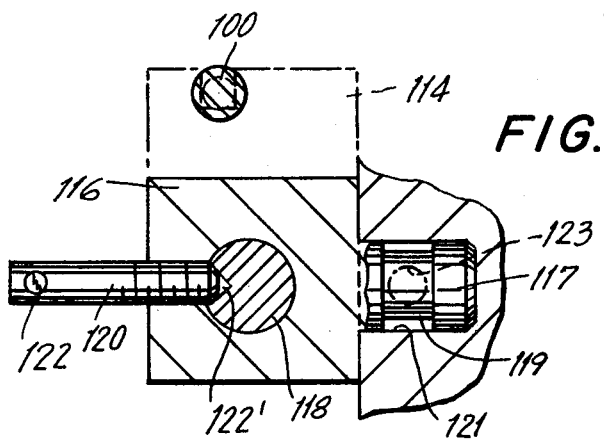
FIG. 8 is a partial sectional view taken generally along the line 8—8 of FIG. 2.
Figure 10:
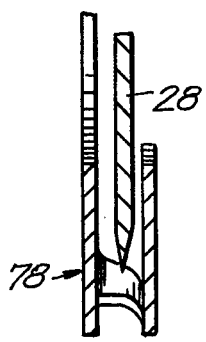
FIG. 10 is a partial sectional view taken along the line 10—10 of FIG. 9.
Figure 9:
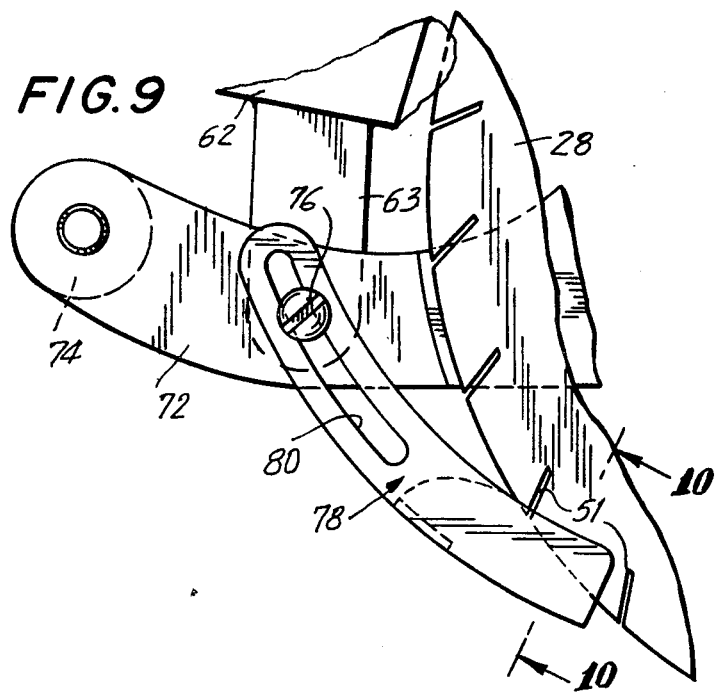
FIG. 9 is a partial side view taken generally along the line 9—9 of FIG. 1.

After the fasteners 38 are loosened the ramp element 36 is moved to the left or right to roughly adjust the position of the gauge, be it for a vertical edge or beveled edge. To accurately adjust the gauge device after its approximate adjustment has been made, there is mounted to the rear of the blade 28 a screw spindle 100 extending transversely of the blade, as best shown in FIG. 7. The screw spindle 100 is threaded in a nut 102 movable with the gauge device and which terminates at one end in a turning knob 104. The connection between the nut 102 and the gauge device comprises the pivotable arm 92.

The screw spindle 100 is held against endwise movement during rotation thereof to effect axial movement of the nut 102, and in turn fine adjustment movement of the gauge assembly or device toward or away from the cutting plane of the blade of knife 28, and is readily movable out of operative position to release the gauge assembly and thus permit quick adjustment in the approximate position of the gauge assembly. For this purpose, the nut 102 is supported on a pivot pin 106 connected to a bracket 108 secured by suitable screw fasteners 110 to the rear end of the arm 92.

The axis of the pivot pin 106 extends at a substantially right angle to the axis of the threaded bolt of the nut 102, so that the screw spindle 100 may be angularly raised into an inoperative position about the axis of the pivot pin 106 or angularly lowered into a horizontal operative position, as best shown in FIG. 7. To hold the screw spindle 100 against endwise movement while in the horizontal operative position, the screw spindle 100 is provided with a plurality of spaced annular recesses or notches 112 (for example, notches 1 inch apart) into which extends a slot or a U-shaped clevis at the upper end of a locking plate 114 formed integral with or otherwise rigidly secured to a rigid, but pivoted end block or slide member 116. This slide member 116 is provided with a shaft extension 117 having a keyway 119. The extension 117 slips into a hole 121 provided in the main plate 26 and is rotatable therein. To maintan the slide member 116 secured pivotably to the main plate 26, a suitable pin or key 123 mates with the keyway 119 and thereby precludes the slide member 116 from dropping out of the hole 121. The slide member 116 serves as a slide bearing for a rod 118, one end of which is suitably affixed to the arm 92, as, for example, by means of a pin (not shown) or it may be threaded into the arm. This rod 118 is clamped against endwise movement and the gauge assembly corresponding is thereby held in a fixed adjusted position by means of a set screw 120 threaded in the pivoted slide bearing member 116. The set screw 120 is provided with a suitable transverse handle bar 122. A longitudinal suitably V-shaped slot 122' extends along the entire length of the rod 118 and same is adapted to receive the conical bearing end or point of the set screw 120 for clamping of the rod against endwise movement.

Accordingly, during use of the apparatus and when it is desired to adjust the position of the gauge device or assembly, the screws or screw 38 is loosened, and the set screw 120 turned so that it does not bear against the rod 118. The screw spindle 100 is then angularly raised about the pivot pin 106 and out of locking engagement with the locking plate 114, and the gauge assembly including ramp element 36 and plate element 82 moved manually into the approximate position desired for the next cutting operation. This adjusting movement of the gauge assembly will cause the ramp element 36 to slide along the screw 38, the released rod 118 to slide through the fixed pivoted bearing member 116, and the nut 102 carrying the screw spindle 100 to move with said rod and said gauge assembly. The gauge assembly is manually moved into approximate desired position with the nearest annular recess or notch 112 on the screw spindle 100 corresponding to that position directly above the clevis end of the locking plate 114. With the gauge assembly in this position, as shown in FIG. 7, the screw spindle 100 is angularly lowered so that the U-shaped clevis at the upper end of the locking plate 114 fits into this nearest recess 112, and the spindle locked against endwise movement. The fine adjustment in the position of the gauge assembly is then effected by turning the screw spindle 100 by means of the knob 104. Since the screw spindle 100 is held by the locking plate 114 against endwise movement, turning of the knob 104 and thereby the screw spindle 100 will cause the movement of the nut 102 axially along the threaded portion of the spindle 100, and since the rod 118 is released and free to move endwise, this movement of the nut 102 causes the corresponding movement of the gauge assembly and of the ramp element 36. when the gauge assembly has reached the desired adjusted position for cutting a specific sized strip of material, the set screw 120 is turned to bear on the rod 118, and the screw 38 clamped down on the ramp element 36, thereby locking the gauge assembly in the desired set position for cutting the material.

When the device is utilized to cut the material on an angle, the following procedures are observed. With the present invention, angles in any suitable increments may be utilized. For example, angles in increments of 5° may be employed. Thus, on the mounting plate 22, a plurality of angle markings at 5° intervals are suitably scribed, as best shown in FIGS. 1 and 2. These scribe lines are preferably 0.010 inch wide by 0.010 inch deep. Of course, other suitable type markings would also be applicable, such as markings provided on a plate mounted on the base member. The spacing between the 5° markings is predetermined and scribed during manufacture of the apparatus, and their use will be explained hereinafter. The main plate 26 which pivots about the axis shaft 24 includes a tubular housing portion 130 for accommodating a shaft 131 having a suitable worm 133 extending from the motor assembly 30, and a gear box housing portion 132 suporting a worm wheel 135 and shaft 134, the latter of which is suitably keyed to the blade or knife 28 for turning or rotating some at the geared down ratio determined by the rpm of the motor and the gearing ratio of the worm and wheel.

Another tubular portion 136 of the main plate 26, preferably formed integrally therewith, extends rearwardly generally parallel to the plate 22 and this extension portion 136 is provided with a rear gripping handle 138, suitably fastened to the portion 136, say by threaded means (not shown). Also connected to this extended portion is a locking arm 139 pivotably mounted by means of a nut 140 to the rear threaded end (not shown) of the pivot shaft or pin 24 supporting the main plate 26.

As best shown in FIG. 2, on one side of the pivotable arm 139 is a locking block 142 adjustably secured to the mounting plate 22, opposite to the scribed degree markings. A locking plate 144 is also adjustably secured to the mounting plate 22 on the other side of the pivotable arm 138. This locking plate as well as the mounting plate 22 each are suitably scribed with a single scribe line for aligning together when the apparatus is to cut at 90°. In such condition, the locking block 142 is moved to bear against the arm 139 so as to hold and maintain the arm 138 and thus the main plate 26 is fixed in a generally vertical position against the locking plate 144. Both the locking block 142 and the locking plate are provided with stub-like ends 145 for bearing against the arm 139, thereby insuring the locking of same in any angular position.

Similar 5° interval marks are suitably scribed or stamped on the locking block 142 and these markings are used in conjunction with the markings on the mounting plate 22 for setting the apparatus at various angles for cutting bevel edges on rubber or other material to be cut. These scribed lines are predetermined and equally spaced at ¼ inch intervals. To cut an angle of 20°, the 0° mark on the locking block 142 is aligned with the 20° mark on the mounting plate 22 by moving the block 142 to the left in FIG. 2 (from rear). The arm 139 is then rotated to the left until it abuts against the stub-like end 145 of block 142 and the locking plate 144 is then also abutted against the arm 138 so as to lock it in place by tightening all of the screws holding the locking elements 142 and 144 to the plate 22.

In a like manner, if an angle is desired to be cut reverse or opposite to the slope of the angle of the above example, then the locking block 142 is moved to the right in FIG. 2, aligning the appropriate angle on the locking block 42 with the 0° mark on the mounting plate 22.

The mounting plate 22 is preferably made of a marine bronze material which has great strength and is highly resistant to corrosion. In addition, such a base is sturdy and relatively heavy, and such characteristics are desirable inasmuch as the entire cutter assembly is pivotable with respect to the base for cutting angular or beveled surfaces in the sheet material. The locking block, locking plate and locking arm are all preferably made of a cold rolled steel which is case hardened so as to resist abrasion and wear inasmuch as these parts are critical in establishing the precise angular adjustments to the apparatus for cutting such angles or bevels on a sheet material. The main plate may also be made of a marine bronze or other suitable strong material.

While the invention has been described, disclosed, illustrated and shown in terms of an embodiment or modification which it has assumed in practice, the scope of the invention should not be deemed to be limited by the precise embodiment or modification herein described, disclosed, illustrated or shown, such other embodiments or modifications as may be suggested to those having the benefit of the teachings herein being intended to be reserved especially as they fall within the scope and breadth of the claims here appended.

What is claimed is:

1. A machine for cutting sheet material having a base and a motor assembly mounted thereon adapted to rotate a circular cutting blade about an axis normally parallel to said base comprising: main plate means pivotably supporting said motor and blade assembly to said base, a locking arm element pivotably secured to said pivotably supporting means, and to said base about a common pivot axis with the axis of said pivot of said pivotably supporting means; and means securing said pivotably supporting means in a substantially fixed set position including means for locking said locking arm element in place, whereby the axis of said blade or the plane of said cutting blade may be set at a predetermined angular position so as to cut said sheet material at a desired angle with respect to the plane of said sheet material.

2. The machine according to claim 1, including rolling means on said base for moving said machine about a surface upon which the machine is placed for cutting said sheet material.

3. The machine according to claim 1, wherein said pivotably supporting means includes a main supporting plate or frame element having means for moving said machine.

4. The machine according to claim 3, wherein said means for moving said machine comprise a plurality of handles, at least one of which is adapted to be manually gripped for guiding the machine as the material is cut.

5. The machine according to claim 1, wherein said predetermined angular position ranges from about 20° to about 90°.

6. The machine according to claim 5, wherein said anuglar position is measured from either side of the cutting plane of said blade where said blade is disposed substantially perpendicularly to said base.

7. The machine according to claim 1, wherein said means for locking said element in said predetermined angular position comprise an adjustable locking element on each side of said element adapted to abut against said element so as to maintain it in said position.

8. The machine according to claim 7, including indicia means on at least one of said locking elements and on said base for aligning said machine in any said predetermined angular position.

9. The machine according to claim 8, including indicia means on the other of said locking elements and on said base for aligning said machine in a generally vertical position for cutting a substantially right angled edge on said sheet material.

10. The machine according to claim 1, including movable guage means for cutting predetermined widths of said sheet material.

11. The machine according to claim 10, wherein said guage means includes swivel means adapted to be adjusted so as to conform to an angular cut surface.

12. The machine according to claim 10, wherein said movable gauge means comprises a screw spindle, a pivotably supported element on said spindle movable therealong upon rotation of said spindle, means for locking said spindle against endwise movement comprising a plurality of notches spaced along said spindle, pivotably supported locking means adapted to engage any one of said notches, said spindle being released from said pivoted locking means by angularly moving said spindle about the pivotal support of said element and out of locking engagement with said locking means, whereby said gauge means may be adjusted manually independently of said screw spindle, means connecting said element and said gauge means for adjusting movement together upon rotation of said spindle, and said gauge means having movable surface means adapted to conform to an angular cut surface.

13. The machine according to claim 12, wherein said pivotably supported locking means is mounted on said pivotably supporting means to the rear of said cutting blade, so as to enable the pivoting of said pivotably supporting means while maintaining said screw spindle substantially parallel to said base.

14. The machine according to claim 13, wherein said notches form annular recesses spaced equally from each other, and said pivotably supported locking means is provided with an upwardly extending clevis portion adapted to be engageable with any one of said recesses.

* * * * *